United States Patent
Schneider et al.

(10) Patent No.: US 8,411,288 B2
(45) Date of Patent: Apr. 2, 2013

(54) METHOD AND A DEVICE FOR MEASURING THE EDGE OF OPTICAL LENSES

(75) Inventors: Gunter Schneider, Marburg (DE); Torsten Gerrath, Marburg (DE); Klaus Krämer, Dautphetal-Friedensdorf (DE)

(73) Assignee: Schneider GmbH & Co. KG, Fronhausen (DE)

( * ) Notice: Subject to any disclaimer, the term of this patent is extended or adjusted under 35 U.S.C. 154(b) by 303 days.

(21) Appl. No.: 12/592,962

(22) Filed: Dec. 4, 2009

(65) Prior Publication Data

US 2010/0141965 A1    Jun. 10, 2010

(30) Foreign Application Priority Data

Dec. 5, 2008 (DE) .................. 10 2008 060 590

(51) Int. Cl.
*G01B 11/14* (2006.01)

(52) U.S. Cl. .................. 356/621; 356/237.1; 356/237.6; 356/601; 451/15; 451/41

(58) Field of Classification Search ............. 356/621, 356/601
See application file for complete search history.

(56) References Cited

U.S. PATENT DOCUMENTS

| | | | |
|---|---|---|---|
| 6,785,585 B1 * | 8/2004 | Gottschald | 700/159 |
| 6,918,822 B2 * | 7/2005 | Arai et al. | 451/42 |
| 6,984,161 B2 * | 1/2006 | Suzuki et al. | 451/5 |
| 8,004,693 B2 * | 8/2011 | Kanno et al. | 356/601 |
| 2004/0119987 A1 * | 6/2004 | Madsen et al. | 356/614 |
| 2010/0141961 A1 * | 6/2010 | Knobel et al. | 356/612 |

FOREIGN PATENT DOCUMENTS

| | | |
|---|---|---|
| DE | G 87 15 619.9 U1 | 3/1988 |
| DE | 36 27 122 C2 | 2/1990 |
| DE | 100 49 382 A1 | 4/2002 |
| EP | 1 250 979 B1 | 10/2005 |
| FR | 2 910 644 A1 | 6/2008 |
| FR | 2 910 646 A1 | 6/2008 |
| WO | WO 2008/093015 A2 | 8/2008 |
| WO | WO 2008/093016 A1 | 8/2008 |

* cited by examiner

*Primary Examiner* — Tarifur Chowdhury
*Assistant Examiner* — Isiaka Akanbi
(74) *Attorney, Agent, or Firm* — Hudak, Shunk & Farine Co. LPA (57) ABSTRACT

A method and an arrangement for determining the coordinates K of at least one point P1 on an edge of an optical lens, wherein the lens is held/can be positioned, by a retaining device, with the edge which is to be measured in an optical path of an optical micrometer, whereby the lens is held/can be positioned with the edge in the optical path, a coordinate Za is determined for the point P1, a variation of the relative position between the lens and the optical path is made, which is based on a pivotal axis S, a coordinate Zb is determined in the new position B for the point P1, and the coordinates Ya and Yb are determined.

18 Claims, 5 Drawing Sheets

METHOD AND A DEVICE FOR MEASURING THE EDGE OF OPTICAL LENSES

FIELD OF INVENTION

The invention relates to a method for determining the coordinates of at least one point P1 on an edge of an optical lens, wherein the lens is positioned by means of a retaining device with the edge to be measured in an optical path which runs in the direction of a Y axis of an optical micrometer which measures in the direction of a Z axis, wherein the relative position between the retaining device and the micrometer is known. Here, the term "lens" refers to unfinished lenses as well as semi-finished and finished lenses or spectacle lenses, as well as precision lenses made of mineral glass.

BACKGROUND OF THE INVENTION

For the final processing of spectacle glasses, the unfinished spectacle glasses, which are usually still round, and which already have the complete range of optical functions, are adapted to the spectacle frame and the individual characteristic values of the respective wearer (e.g. distance between the eyes). For this purpose, the unfinished lens, which is tensioned in the machine for edge processing, known as the "edger" can be calibrated. Then, the unfinished lens is machined to the contour of the end form with an over measurement. A measurement is again conducted in which primarily the position of the edges is to be determined, in order to incorporate corresponding form elements such as facets or grooves into the edge. In practise, sensing systems are usually currently used for measuring the lens, which measure the front and rear side of the lens until close to the edge. The disadvantage of the sensing systems is the risk of damaging the spectacle lens.

A method is already known from EP 1 250 979 B1, in which a laser beam is projected onto the edge of the lens and by means of a camera which stands at a fixed angle to the laser beam, the reflection is recorded and evaluated with regard to the radius and the height information of the edges. The disadvantage is the strong dependence on the surface quality or surface roughness of the unfinished spectacle lens which according to the principle in this document is subject to narrow tolerances. Furthermore, this type of measurement is affected by humidity on the lens. Finished lenses cannot be measured using such a method due to a lack of surface roughness.

DE 8715619 U1 describes the measurement of a spectacle frame with two laser micrometers which are arranged at right-angles to each other. It is mentioned that edges are measured, although on the basis of the description, it is clear that not the edges, but the expansion of the frame is determined, wherein an outer point of the frame does not always have to coincide with an edge.

A similar principle is described in DE 38 27 122 C2, according to which it is not the edge of the spectacle frame, but the radial expansion of the lens which is determined, which as can be seen with the example of a convex edge, does not always have to coincide with the edge.

SUMMARY OF THE INVENTION

The object of the invention is to design and arranged a method and a device in such a manner that a rapid and precise measurement of an edge of a lens is guaranteed.

The object is attained according to the invention by means of a method and a device according to the claims.

An optical micrometer is a type of light curtain or optical path with a corresponding evaluation unit which determines which part of the optical path is partitioned or shadowed or weakened. The measuring strategy is based on the fact that the lens with the edge to be measured is held into the optical path, i.e. the optical path "affects" the edge. An edge which is arranged behind the lens in relation to the direction of the optical path is covered by the lens and is accordingly not in the optical path. Even if the edge is located in front of the lens in relation to the direction of the optical path, said edge is hit by the optical path, but is not in the optical path because its height information is not detected. For example, the lens can be held on a pivot axis S into a position A in the optical path in such a manner that the lower or upper edge of the lens represents the highest (or lowest) value in the optical path, i.e. it forms a maximum value (or minimum value). As a result, height information is determined for a point P1. However, it is not known at which point along the path the point P1 is located. For this purpose, the lens is for example held at a second angle in a position B into the optical path and a further micrometer measurement value is recorded for the point P1. This results in an equation system with two unknowns which can be solved, with which the one point P1 can be clearly determined on the edge of the lens. Due to a pivoting or rotation of the lens around a axis of rotation R, a series of points P1-Pn can be determined on the edge of the lens. Position A and position B in the optical path can also coincide. The relative position between the lens and the optical path which has been pivoted around an angle β is decisive. This pivoting can be overlaid by any translatory movement, e.g. in order to again or also position the lens or required point in the optical path.

In general, the pivotal point Sp must be at a distance P1$u$ from the point P1 to be measured.

Figure 2:
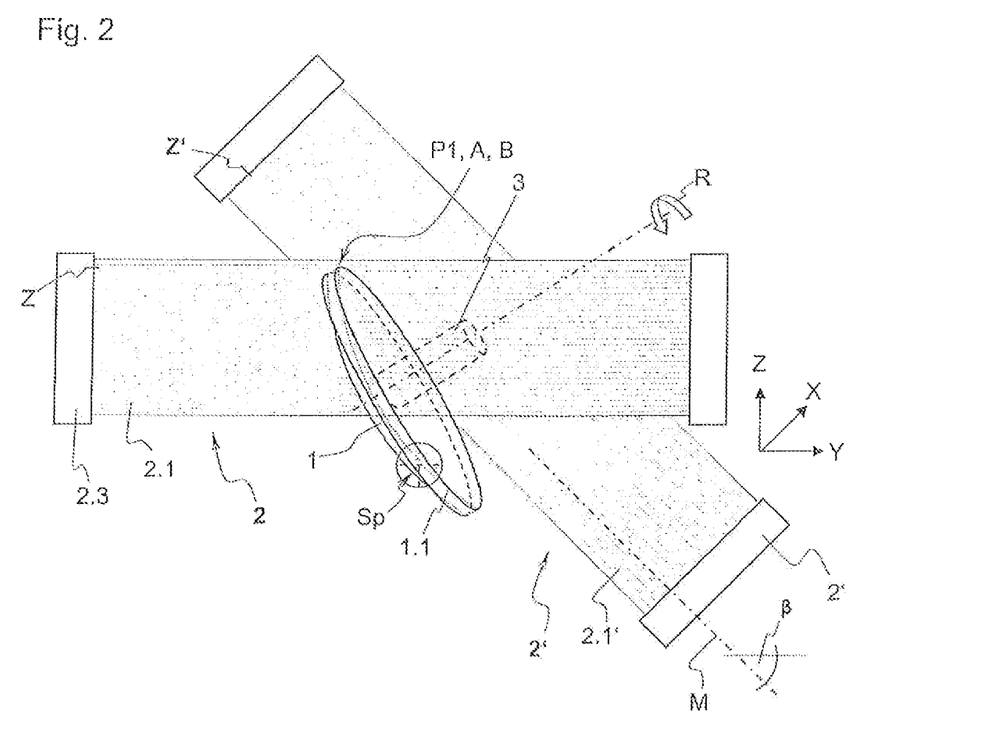
FIG. 2 shows a principle drawing of the method with two micrometers FIG. 3$a$ shows a principle drawing of the method when two points are determined simultaneously FIG. 3$b$ shows an alternative to the method for determining two points simultaneously

Due to the measuring for example of the Z coordinates of a point P1 in two different pivoting positions A, B of the lens within the optical path, the position of the point P1 relative to the retaining device for example can be determined easily using the following equations.

$$\sin\alpha = \frac{Za}{r} \text{ and } \sin(\alpha + \beta) = \frac{Zb}{r}$$

with the two unknowns, the angle α and the radius r. The angles α and β are in each case limited by the radius r and the horizontal, as can be seen in FIG. 2.

After the equation system has been resolved, the respective Y coordinate results from the following equation:

$$Ya = \sqrt{r^2 - Za^2} \text{ and } Yb = \sqrt{r^2 - Zb^2}$$

The X coordinate is known for point P1 in both positions A and B. This corresponds to the X coordinate of the optical path or of the Y-Z level which is tensioned by it.

Decisive for the detection of an edge is an angle α which is less than 90°. Otherwise, it is not always guaranteed that the edge in both positions A and B creates a minimum or a maximum for the micrometer value. In cases of doubt, the edge is in one of the two positions in the shadow of the other, or second, edge.

For the purpose of guaranteeing the greatest possible precision, the angle β should however be as wide as possible.

According to the invention, the lens with the edge to be measured is held in the optical path, a first Z coordinate Za is determined for the point P1 of the edge which is located in the optical path in a position A, wherein an X coordinate Xa of the point P1 corresponds to the X coordinate of the optical path.

Thus the relative position between the lens and the optical path is changed by a pivotal movement, or alternatively, the lens is hit by a second optical path which has a different relative position to the lens than the first optical path, wherein the first optical path is pivoted relative to the second optical path. Then, a second Z coordinate Zb is determined for the point B1 of the edge which is located in the optical path in position A or in a second position B, wherein the X coordinate Xb corresponds to the X coordinate of the optical path. On the basis of two equation systems for the point P1 for both relative positions or in position A, or in the two positions A and B in the optical path, the missing coordinates Ya and Yb and thus the position of the point P1 are determined.

It can be advantageous when the change to the relative position between the lens and the optical path results from a change to the position of the lens and/or from a change to the position of the optical path. The change in position preferably occurs by pivoting around a pivotal axis S around an angle β. Here, in general, the lens and/or the optical path or optical micrometer can be pivoted. This pivotal movement can be overlaid by any number of translatory movements required, in particular in order to position the required point in the required position in the optical path.

It can also be advantageous when the second optical path is pivoted relative to the first optical path around an angle β, wherein the second optical path is retained by means of a second micrometer or by deflecting at least one part of the first optical path. When a second optical path is used, the change in position of the lens or of the optical path is superfluous. The point P1 has a different position A, B in the respective optical path, so that the equation system described above can be established and evaluated. The relative position between both optical path inlets or both micrometers and the retaining device is known.

The pivoting can here be conducted with reference to the X axis and/or to the Z axis.

In cases when the optical path is deflected, at least one second receiver for the deflected optical path is necessary.

Here, it can advantageously be provided that the angle β is less than 90°. Usually, when the lens is pivoted around 90° or more, an overlap of the edges occurs, so that a minimum or maximum for the micrometer value cannot be achieved by one edge. The reason for this is that in general, the edge surface of the lens between two edges and the level tensioned by a rear or upper, or lower edge comprises an angle of 90°. Accordingly, the lens must be raised somewhat at an angle in relation to the above-mentioned level opposite the beam path of the micrometer, in order for example to obtain a first micrometer value for the front edge. When on the basis of this relative position, a pivot of 90° is conducted, the front edge is covered over by the rear edge with reference to the beam path.

It can be of particular importance for the invention when the measurement is conducted for several points P1 to Pn over the circumference of the edge to be measured, wherein the retaining device or the optical path or micrometer rotate around a axis of rotation R. In general, it is not only the position of a point on the edge that is of interest, but also the position of the edge as a whole, interpolated over the position of several points around the circumference of the edge. The hitting of several points on the circumference can be achieved by rotating the lens or micrometer or optical path around the axis of rotation R.

In connection with the design and arrangement according to the invention, it can be advantageous when initially, the respective coordinate Za is determined for several points P1 to Pn in position A, and then the respective coordinate Zb is determined in the changed position B for the points P1 to Pn.

In general, the position of both edges of the lens must be determined. The method according to the invention applies to the second edge accordingly. For two points P1, P1u of the upper and lower edge which lie opposite with reference to the optical path in a measuring level, four measurements are therefore required. The first measurement (first micrometer measurement value) is preferably conducted for several points around the circumference of the edge. The rotation around the axis of rotation R is thus conducted before the relative position between the lens or edge and the optical path is changed. The determination of the micrometer value for several points over the circumference is completed relatively quickly. Then, the second measurement is conducted for a second micrometer value for several points of this edge in the changed relative position. Thus, two measurements are fulfilled for several points on an edge.

For the second edge, a first measurement and a second measurement are conducted accordingly, wherein the first measurement for the second edge can also be conducted before the second measurement for the first edge.

The measuring precision can be increased by the methods listed below, which are all based on the fact that greater quantities of data are generated which can lead to an over-determination, but which can also be resolved by corresponding average value methods or "best fit methods".

Multiple rotation of the axis of rotation. Thus, different partial sections or points of an edge are measured repeatedly.

Increase in the number of points P1-Pn on the circumference. Depending on the resolution, the number of points determined over the circumference of an edge can be increased as required. The sections or gaps to be interpolated thus become smaller.

Evaluation of more than two positions or relative positions for one point. This is guaranteed by a corresponding number of pivoting positions or several measuring systems or optical paths.

It can furthermore be advantageous when for the purpose of measuring several points P1 to Pn over the circumference of the lens or the edge, a relative movement is conducted between the lens and the optical path in a direction of an X axis. The distance xR in the X direction between the axis of rotation R and the optical path is variable or adjustable. Since there is a trend towards square, very narrow spectacle lenses, currently, holders or block pieces or retaining shafts are used for the spectacle lenses which are not rotationally symmetrical. In order to be able to make a measurement until close to the holder or retaining shaft, the rotational movement of the lens around the axis of rotation R can be overlaid by a movement in the X direction so that the optical path is not influenced or covered by the holder.

It can also be advantageous when the determination of the Z coordinates of a point P1 on an upper edge of the lens and the determination of the Z coordinates of a point P1u on a lower edge of the lens are conducted with an optical path without changing the relative position between the lens and the optical path. Depending on the height of the optical path, the geometry of the lens to be measured and the angle position between the lens and the micrometer, the upper edge and lower edge can be measured simultaneously. The number of measurements required, i.e. two measurements for the upper edge and two measurements for the lower edge, can be reduced to three or two measurements. The prerequisite for this is that in one position, one point of each edge is determined at one and the same time, and then only one shared further measurement is conducted for both points, or one further measurement is required for each point in another relative position. Here, it is advantageous when the edge of the lens is even and the angle position of the edge is known in relation to the axis of rotation R.

Furthermore, it can be provided that in cases when the relative position between the upper edge and the lower edge is known, only coordinates of the points P1 to Pn of the upper edge are determined, and from these, the coordinates P1$u$ to Pn of the points on the lower edge are determined. The number of measurements is thus limited to two.

Here, it can be advantageous when in order to determine a raising angle γ of a surface O which borders on the upper edge in point P1 or of a tangent which is in contact at point P1 in a radial direction to the axis of rotation R, initially
a) the lens is held into the optical path with the point P1 of the upper edge, so that the point P1 of the upper edge is in the optical path, or forms a minimum or a maximum for the micrometer measurement value
b) a pivotal point SP of the lens is laid into the point P1
c) the lens is pivoted around the point P1 until the surface O or the tangent have the same or a minimally larger micrometer value than the point P1, in such a manner that the imaginary tangent is parallel to the direction Y
d) from the position of the axis of rotation R or the lens, the raising angle γ is determined.

In order to enable a drill hole to be applied in an adjusted angle (usually at right-angles) to the surface of the upper side of the lens, the curvature of the surface in the edge area is also of interest in addition to the position of the edges. For this purpose, during the measurement of the position of the upper edge, the lens can be positioned in such a manner that the upper edge forms a maximum or a minimum, and is pivoted around the pivotal point Sp (point P1) until the tangent has the same measurement value or until the measurement value changes. The angle position between the axis of rotation R and the Z axis or the vertical, then coincides with the angle position between the edge of the lens and the tangent.

Ultimately, it can be advantageous when, for the purpose of checking a drill hole and/or a groove, the lens is rotated by means of the axis of rotation R at least with the drill hole through the optical path. For the purpose of quality control, with the method according to the invention, both the circumference of a lens and the position of facets can be inspected. Additionally, the position and the form of drill holes or grooves can be inspected. In particular when drill holes are not fully completed, the tool has run off course during drilling or the tool has broken, this can easily be detected in this manner.

The invention also relates to a measuring arrangement for measuring an edge of a lens with a retaining device for the lens and with an optical micrometer which measures in the direction of a Z axis I order to generate an optical path which runs in the direction of a Y axis, within which the lens can be positioned, wherein the retaining device and the optical path can be rotated relative to each other around an axis of rotation R, wherein a pivotal axis S is provided, by means of which the lens and the optical path can be pivoted relative to each other around an angle β, wherein the pivotal axis S comprises with the axis of rotation R an angle δ, which is greater than 10° and less than 170°, and is preferably between 80° and 100°.

On the device side, it can be provided that the pivotal axis S comprises with the Y axis an angle φ of between 80° and 100°.

The pivotal angle β should be as wide as possible, wherein a value of 90° only guarantees the required measurement result in exceptional cases. A value of below 90° always leads to the required result.

It would be disadvantageous to lay the axis of rotation R into the measuring system, in particular with regard to the mechanical processing of the lens. The pivotal axis S can however lie either on the workpiece side or on the measuring system side.

Finally, it can be advantageous when the axis of rotation runs parallel to a Z-Y level of the optical path at a distance xR, or comprises an angle ε with the Z-Y level, which is greater than 0° and less than 20°.

Figure 7:
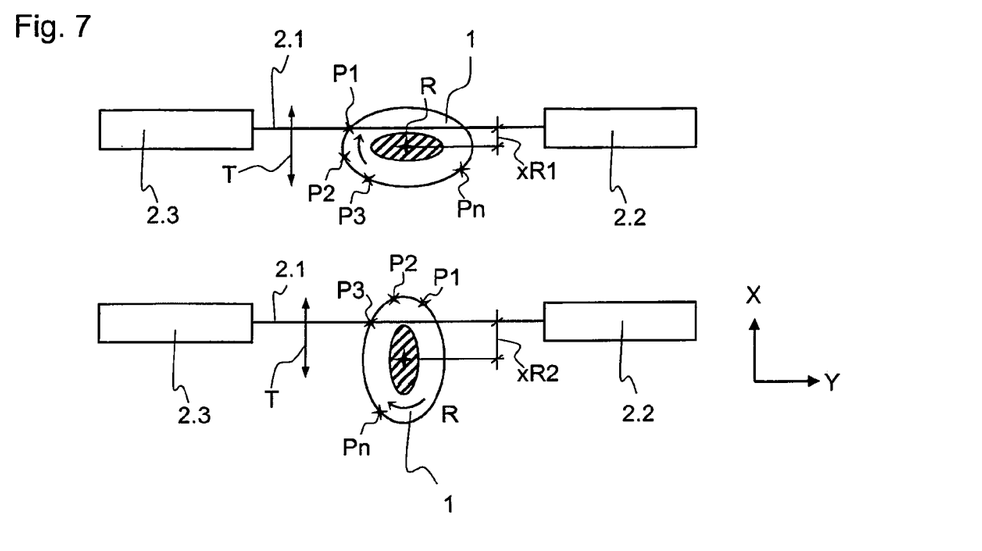
FIG. 7 shows a principle drawing on the method relating to a relative movement in the X direction

Since there is a trend towards square, very narrow spectacle lenses, currently, block pieces (retaining pieces for the spectacle lenses) are already in use which are not rotationally symmetrical. In order to enable a measurement here until close to the holder, the rotational movement of the lens, as can be seen in FIG. 7, can be overlaid by a movement in the X direction.

The invention also relates to a measuring arrangement described above in which by contrast a second optical path is provided which runs in the direction of an M axis, within which the lens can be positioned, wherein between the M axis and the Y axis, an angle β is provided which is less than 90°, or the axis of rotation R runs at a distance xR parallel to a Z-Y level of the optical path, or the axis of rotation R comprises an angle ε with the Z-Y level which is greater than 0° and less than 20°. For the evaluation according to the invention, it is sufficient only to position the axis of rotation R and two measuring systems or optical paths at different angles to the axis of rotation R. Two measuring systems or optical paths guarantee a shortening of the measuring time. Alternatively or as a supplement to this, the Z-M level is also possible, alongside the Z-Y level, for the distance xR. The angle β should, as already described above, be as wide as possible, but should be less than 90°.

A further movement axis T, by means of which the lens and the optical path can be moved relative to each other in the direction of an X axis and at right-angles to the Y axis, guarantee a small distance between the optical path and the axis of rotation or the retainer or block piece, as has already been described above.

If the retaining device can be affixed to the lens on one side, such as by means of a block piece which is attached to the lens, greater room for manoeuvre remains for the relative position between the lens and the optical path. A semi-shaft for the retaining device is not included in this case. Due to the tensioning on one side, no collision occurs between the receiver or transmitter and the second semi-shaft. Here, the axis of rotation can preferably lie in the Z-Y level of the optical path.

The prepositions such as "upper" and "lower" named above, together with "transmitter" and "receiver" can also as a rule be interchanged.

BRIEF DESCRIPTION OF THE DRAWINGS

Further advantages and details of the invention are explained in the patent claims and in the description, and are shown in the figures, in which:

FIG. 1$a$ shows a principle drawing relating to the pivoting of the lens in the optical path FIG. 1$b$ shows a principle drawing of the geometric principles

DETAILED DESCRIPTION OF THE INVENTION

Figure 1A:
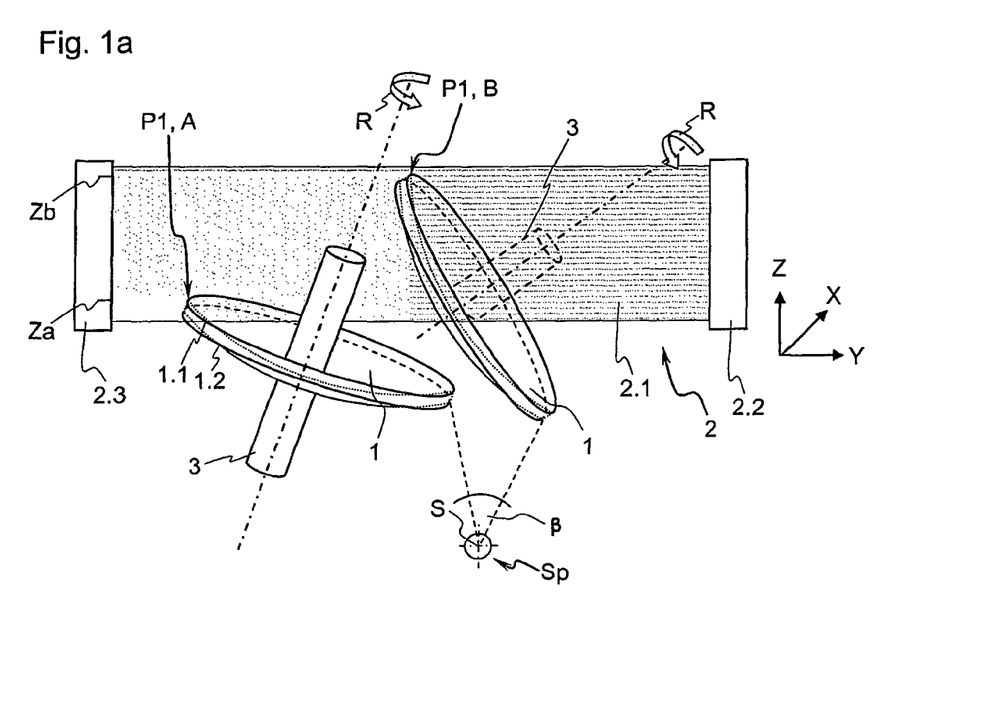

The measuring setup shown in FIG. 1a comprises an optical micrometer 2 by means of which an optical path 2.1 can be generated which runs in the direction of a Y axis. The optical path 2.1 runs between a transmitter 2.2 and a receiver 2.3. By means of the optical micrometer 2, a position or expansion of a point or a body can be recorded in the direction of a Z axis in the Z-Y level of the optical path 2.1.

For the purpose of determining the position of a point P1 of a lens 1, said lens is positioned by means of a retaining device 3 in a first position A in the optical path 2.1, so that the point P1 generates a measuring value, by contrast to which all other points of the lens 1 which are not in the optical path 2.1 are not given a measuring value. By means of the micrometer 2, a first Z coordinate Za can thus be determined.

By pivoting the retaining device 3 with the lens 1 into a second position B around an angle β, which is preferably less than 90°, the point P1 is moved into a second position B in the optical path 2.1, within which it generates another micrometer measuring value. In this second position B, the Z coordinate Zb of the point P1 can be determined. The pivoting movement is here conducted around a pivotal point Sp or a pivotal axis S by the aforementioned angle β.

For the point P1 in the respective position A, B, the Z coordinates Za or Zb and the X coordinate are known. The X coordinate Xa, Xb here corresponds to the X coordinate of the optical path 2.1.

Figure 1B:
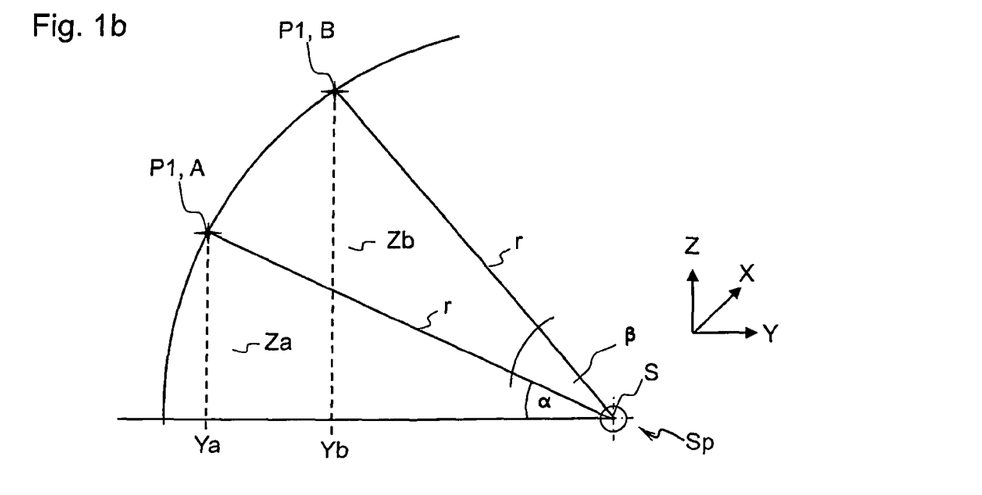

These geometric relations can be graphically illustrated according to FIG. 1b. A search is made for the two coordinates Ya and Yb for the point P1 in the respective position A, B. Both the radius r and the initial angle α between the radius r in position A and a Y axis. By means of the equations below, an equation system can be developed and ultimately, the two Y coordinates Ya and Yb can be calculated.

$$\sin\alpha = \frac{Z\alpha}{r} \text{ and } \sin(\alpha + \beta) = \frac{Zb}{r}$$

$$Y\alpha = \sqrt{r^2 - Z\alpha^2} \text{ and } Yb = \sqrt{r^2 - Zb^2}$$

The retaining device 3 shown in FIG. 1a is formed by two semi-shafts which are not described further, between which the lens 1 is tensioned. The retaining device 3 furthermore comprises an axis of rotation R by means of which the lens 1 can be turned or rotated concentrically through the retaining device. In order to determine further Z coordinates for several points on the edge 1.1, the lens 1 can rotate in the respective position A, B via the axis of rotation R, so that a Z coordinate can be determined for as many points Pn as required over the circumference of the entire edge 1.1, 1.2. In this manner, the position of the edge 1.1 and accordingly also the position of the edge 1.2 can be determined. In order to determine the values for one edge 1.1, the lens 1 must first be positioned via the retaining device 3 and the pivotal axis S within the optical path 2.1 in such a manner that the edge 1.1 or a corresponding point P1 represents a minimum or maximum point, i.e. is arranged within the optical path 2.1. Then, the lens 1 must be pivoted in a corresponding manner via the pivotal axis S in such a way that the same edge 1.1 is positioned in the maximum position in the optical path 2.1, wherein the pivotal angle β should be selected to be as wide as possible, but less than 90°. In both positions A, B, the lens 1 can be turned via the axis of rotation R and thus as many points as required can be recorded over the circumference of the edge 1.1. The same applies to the edge 1.2.

According to FIG. 2, it is possible as an alternative to use two optical micrometers 2 instead of guaranteeing a pivoting of the lens 1 between two positions A, B. While the first micrometer 2 or its optical path 2.1 is aligned in the direction of the Y axis, the optical path 2.1' of the second micrometer 2' is aligned in the direction of an M axis. The M axis is pivoted or raised in relation to the Y axis by an angle β. The method for recording the two Z values Za and Zb for the point P1 is as follows. The lens 1 is positioned via a retaining device 3 not further described within the first optical path 2.1 and within the second optical path 2.1' in such a manner that a point P1, for example on the upper edge 1.1 within the optical path of the first micrometer 2.1 and within the optical path 2.1' of the second micrometer 2', wherein the micrometer measuring values, as is also the case with the method shown in FIG. 1a, are as different as possible from each other. This difference is essentially due to the fact that the angle β between both optical paths 2.1, 2.1' or between both positions A and B is as wide as possible according to FIG. 1a.

With the method shown in FIG. 2, it can in general be provided that the M axis is pivoted around the X axis and/or around the Z axis. Both leads to a raising in relation to the Y axis and thus to an altered pivoting position.

As an alternative to the method shown in FIG. 2, it can also be provided that when a micrometer 2 is used and an additional deflection mirror, not shown are used, two optical paths 2.1, 2.1' are provided which are aligned at an angle β to each other without having to use a second micrometer 2'. However, a second receiver is advantageous for the deflected optical path.

Figure 3A:
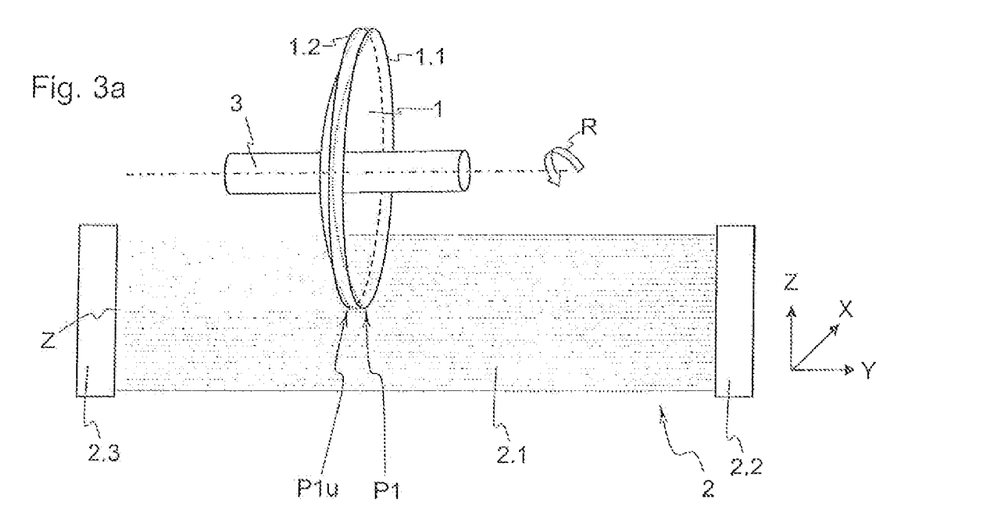

According to the method shown in FIG. 3a, the Z coordinates of two adjacent points P1, P1u of an upper edge 1.1 and a lower edge 1.2 can be recorded simultaneously, insofar as the edge which is restricted between two edges 1.1, 1.2 is planar or even or even concave. Both points P1, P1u form a maximum point and are thus located within the optical path 2.1, so that for the respective point P1, P1u, only one further measurement is required in another relative position B.

Figure 3B:
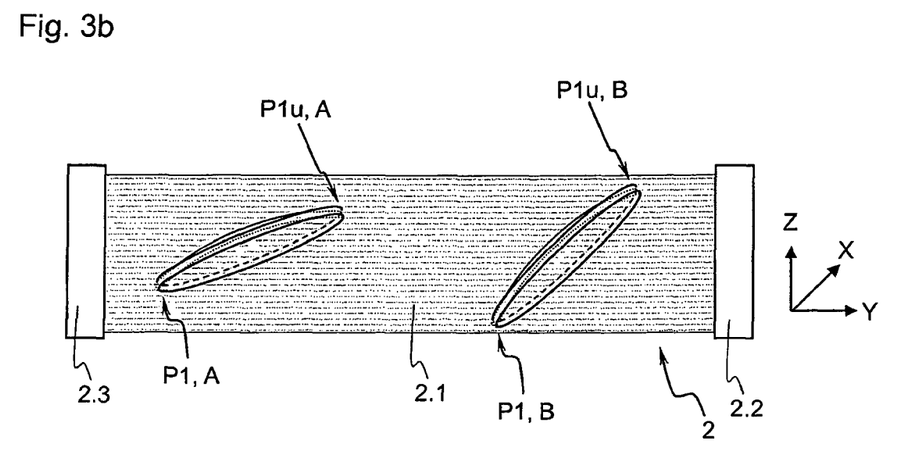

As an alternative, according to the method shown in FIG. 3b, two points P1, P1u can also be measured simultaneously, which are however arranged opposite. In this case, the second measurement can also be conducted for both points, so that overall, only two measurements are required for two points.

According to the method shown in FIG. 1a and FIG. 2, for each point P1-Pn of an upper edge 1.1, two measurements are required, and equally, for each point of a lower edge 1.2, two measurements are required. According to the method shown in FIGS. 3a, 3b, in order to determine the two Z coordinates for both points P1, P1u, as described above, only three or two measurements are then required overall.

Figure 4:
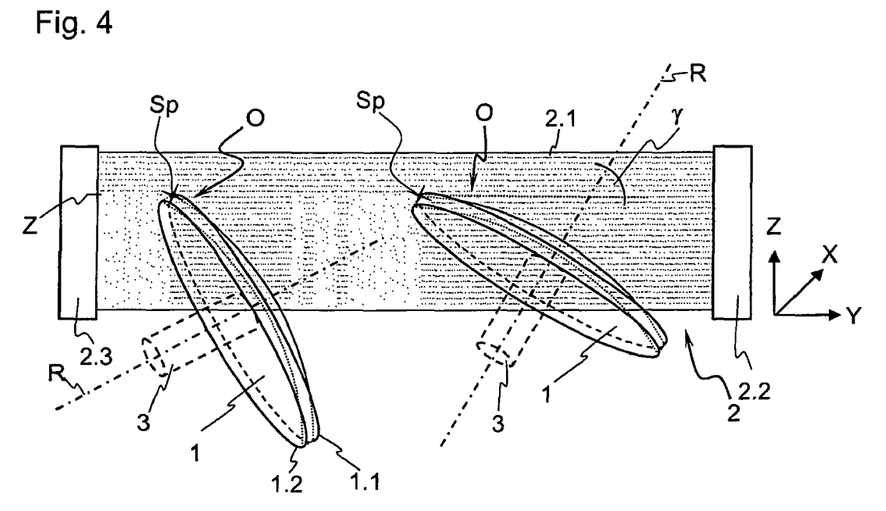
FIG. 4 shows a principle drawing on the method for determining the tangent

According to FIG. 4, by means of the measuring set up according to the invention, the angle or raising of a surface of the lens 1 which touches the surface edge 1.1, can also be determined. For this purpose, the lens 1, as is otherwise also the case, is positioned in the optical path 2.1 in such a manner that the upper edge 1.1 is positioned in the optical path 2.1 (maximum position). Thus the lens 1 is pivoted around this point, which now acts as a pivotal point Sp, until the surface O of the lens 1 which touches the upper edge 1.1 achieves this measuring value which was previously generated by the edge 1.1. The lens 1 is therefore pivoted until a tangent which radially touches the edge 1.1 at point Sp is aligned parallel to the Y axis, i.e. in the direction of the optical path 2.1. The angle γ which is drawn in represents the raising angle between the edge and the surface O. On this basis, other angle ratios, such as that between the edge and the axis of rotation R, can be determined.

Figure 5:
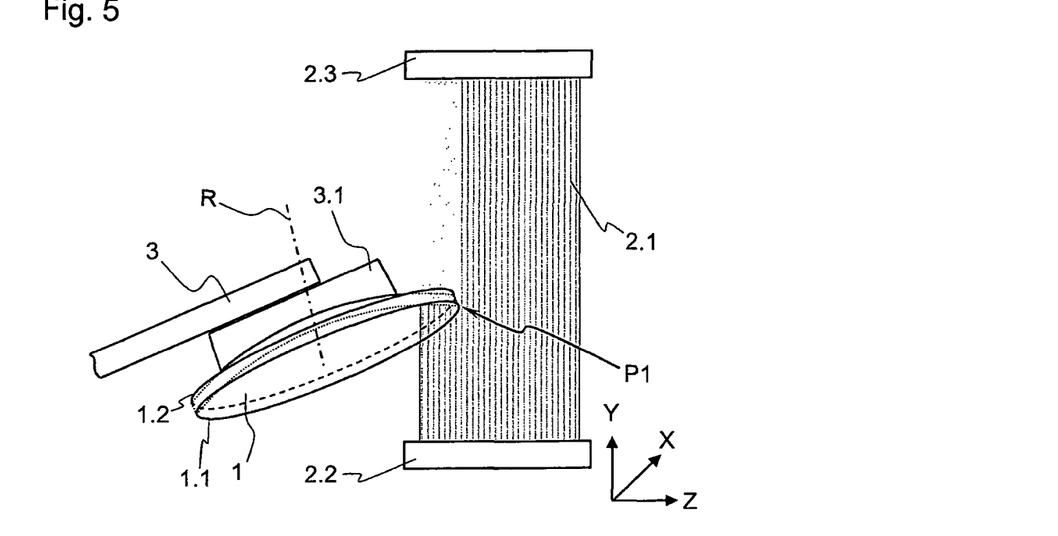
FIG. 5 shows a principle drawing on the method with a single-sided holder

According to the exemplary embodiment shown in FIG. 5, the retaining device 3 is designed in a one-sided manner. The lens 1 is here held by a block piece 3.1 which can be pivoted on the retaining device 3 around the axis of rotation R. When a single-sided retaining device 3 is used without a second semi-shaft, the range of application of the micrometer 2 is extended, since there is no danger of collision between the micrometer 2 and a second semi-shaft 3. If the relative position between the upper and lower edge 1.1, 1.2 of the lens 1 is known, it is sufficient to measure one of the two edges 1.1, 1.2, and according to FIG. 5, the upper edge 1.1, in order to reach a conclusion regarding the position of the lower edge 1.2.

Figure 6A:
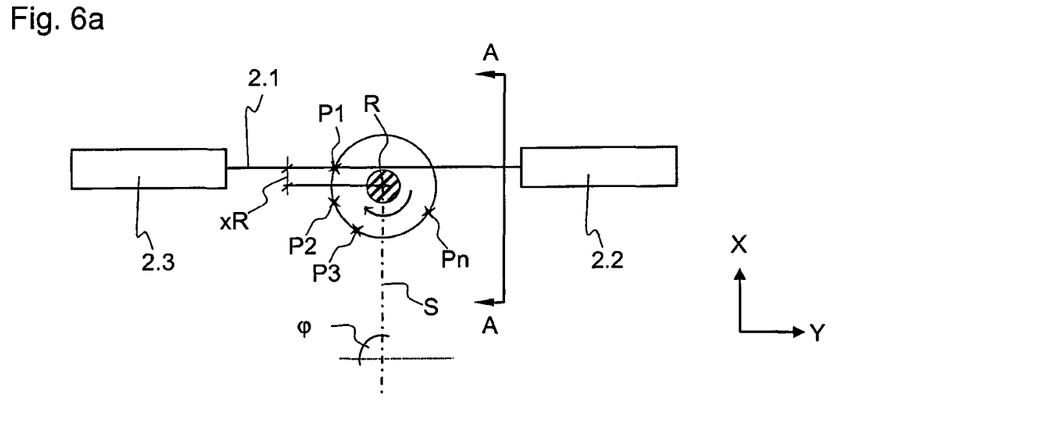
FIG. 6a shows a principle drawing on the position and movement of the axes

FIG. 6a shows the test arrangement from the perspective of the Z axis, i.e. with reference to FIGS. 1 to 5 from above. The pivotal axis S comprises with the Y axis an angle φ of approximately 90°. The axis of rotation R comprises a distance xR to the optical path 2.1. The axis of rotation R in this case rotates in a clockwise direction, so that for the point P1 and subsequently for the points P2, P3 to Pn, the respective Z coordinate value can be determined by rotation around the axis of rotation R.

Figure 6B:
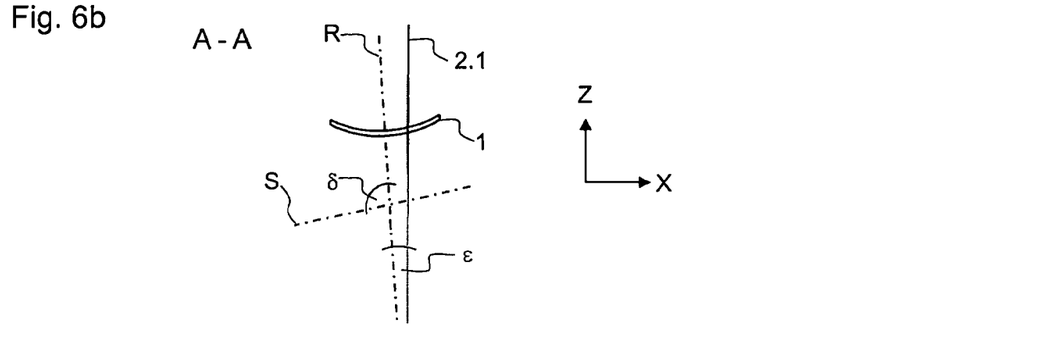
FIG. 6b shows a view FIG. AA from FIG. 6a relating to the positions of the axes M

FIG. 6b shows the principal test arrangement in the view A-A from FIG. 6a, i.e. from the right hand side. The optical path 2.1 runs essentially vertically in relation to its measuring direction in the direction of the Z axis. The axis of rotation R comprises with the Z axis, i.e. with the level of the optical path 2.1, an angle c which in FIG. 6b is 5°. The axis of rotation R can in principle also run parallel to the measuring level 2.1 or to the Z axis with the distance xR.

The pivotal axis S is raised in relation to the X axis by an angle γ of approximately 14°. In general, the pivotal axis S can also run parallel to the X axis.

According to the exemplary embodiment shown in FIG. 7, the retaining device or retaining shaft 3 is not rotationally symmetrical, but is adapted approximately to the form of the lens 1 which is also not rotationally symmetrical, for the purpose of optimising the support of the lens 1. In order to enable the measurement according to the invention to be conducted with the lowest possible distance xR, a variation of the distance xR over a further movement axis T, which is here designed as a translation axis, is provided. By means of the movement axis T, the distance xR between the values xR1 and xR2 can be varied, so that during the rotation around the axis of rotation R (according to the arrow direction), a distance xR between the optical path 2.1 and the retaining device 3 is kept as low as possible, so that on the basis of the measurement of the point P1, point P3 can also be recorded and the optical path 2.1 is not covered by the retaining device 3. The movement axis T can also be designed as an axis of rotation.

Figure 8:
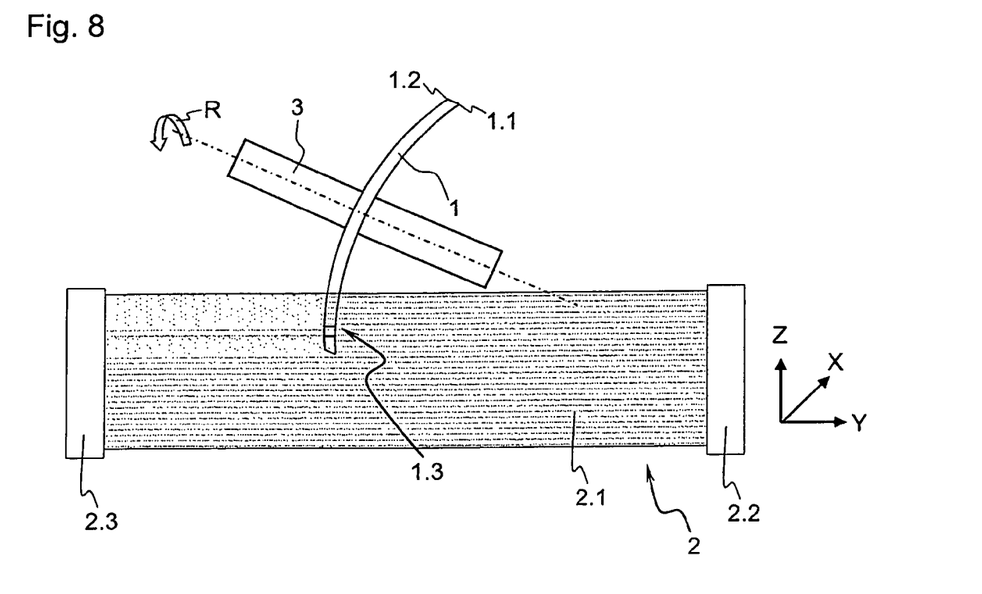
FIG. 8 shows a principle drawing on the method for checking drill holes

According to the test arrangement shown in FIG. 8, a drill hole and/or a groove 1.3 of a lens 1 can be tested using the micrometer 2. As soon as the drill hole 1.3 shows faults such as a lack of material opening, incorrect diameter or remaining residues such as broken-off tools or similar, this would influence the optical path 2.1 which falls through the drill hole 1.3, and this in turn would be detected by the receiver 2.3.

| List of reference numerals | |
|---|---|
| 1 | Optical lens, lens |
| 1.1 | Edge, upper edge |
| 1.2 | Edge, lower edge |
| 1.3 | Drill hole |
| 2 | Optical micrometer |
| 2' | Second micrometer |
| 2.1 | Optical path |
| 2.1' | Optical path |
| 2.2 | Transmitter |
| 2.3 | Receiver |
| 3 | Retaining device, retaining shaft |
| 3.1 | Block piece |
| A | Position |
| B | Position |
| K | Coordinate (X, Y, Z) |
| M | Axis |
| O | Surface |
| P1 | Point |
| P2 | Point |
| P3 | Point |
| Pn | Point |
| P1u | Point |
| r | Radius, distance from pivotal point SP |
| R | Axis of rotation |
| S | Pivotal axis |
| Sp | Pivotal point |
| T | Movement axis, pivotal or translation axis |
| X | Axis |
| Y | Axis |
| Z | Axis |
| Xa | Coordinate |
| Xb | Coordinate |
| Ya | Coordinate |
| Yb | Coordinate |
| Za | Coordinate |
| Zb | Coordinate |
| α | Angle |
| β | Angle |
| δ | Angle |
| ε | Angle |
| γ | Angle |
| φ | Angle |
| xR | Distance |
| xR1 | Distance |
| xR2 | Distance |

The invention claimed is:

1. A method for determining the coordinates K of at least one point P1 on an edge of an optical lens, wherein the lens is retained by a retaining device having an axis of rotation R, with the edge extending in a circumferential direction to an axis of the optical lens and to the axis of rotation, the edge to be measured is held in an optical path of an optical micrometer which measures in the direction of a Z axis, the optical micrometer transmitting a linearly extending optical path of parallel light, with the optical path running in the direction of a Y axis, wherein the relative position between the retaining device and the micrometer is known, comprising the steps of:
   a) holding the lens with the edge to be measured in the optical path
   b) determining a first Z coordinate Za for the point P1 of the edge which is located in the optical path in a position A, wherein the point P1 represents a maximum or minimum value of the optical path, an X coordinate Xa of the point P1 corresponds to the X coordinate of the optical path
   c1) changing the relative position between the lens and the optical path by means of a pivoting movement around a pivotal axis S being inclined to the axis of rotation R, the point P1 being located in the optical path in a position B and representing a maximum or minimum value, or c2) the lens is hit by a second optical path which has a different relative position to the lens than the first optical path, wherein the first optical path is pivoted relative to the second optical path and that the point P1 represents a maximum or minimum value in the second optical path, and d) determining a second Z coordinate Zb for the point P1 of the edge which is located in the optical path, and e) determining on the basis of two equation systems for the point P1, for both relative positions, the missing coordinates Ya and Yb and thus the position of the point P1.

2. A method according to claim 1, wherein the change to the relative position is made by changing the position of the lens and/or by changing the position of the optical path.

3. A method according to claim 1 wherein the second optical path is pivoted relative to the first optical path by an angle β, wherein the second optical path is maintained by means of a second micrometer or by deflecting at least one part of the first optical path.

4. A method according to claim 1, wherein the measurement for several points P1 to Pn is conducted over a circumference of the edge to be measured, wherein the retaining device and the optical path rotate relative to each other around an axis of rotation R.

5. A method according to claim 4, wherein initially for several points P1 to Pn in position A, the respective coordinate Za is determined and then in the changed position B, the respective coordinate Zb is determined for points P1 to Pn.

6. A method according to claim 4, wherein for the purpose of measuring several points P1 to Pn over the circumference, a relative movement between the lens and the optical path is conducted in a direction of an X axis.

7. A method according to claim 1, wherein the determination of the Z coordinates of a point P1 on an upper edge of the lens and the determination of the Z coordinates of a point. P1u on a lower edge of the lens with an optical path are conducted without changing the relative position between the lens and the optical path.

8. A method according to claim 1, wherein for the purpose of determining a raising angle γ of a surface O which touches the upper edge at point P1, initially
a) the lens is held with the point P1 of the upper edge in the optical path
b) a pivotal point Sp of the lens is laid into the point P1
c) the lens is pivoted around the point P1 until the surface O has the same or greater micrometer value than point P1
d) from the position of the axis of rotation R, the raising angle γ is determined.

9. A method according to claim 1, wherein for the purpose of checking a drill hole and/or a groove, the lens is rotated by means of the axis of rotation R at least with the drill hole through the optical path.

10. A measuring arrangement for measuring an edge of an optical lens, the edge extending in a circumferential direction to an axis of the optical lens, comprising: a retaining device for the lens and an optical micrometer which measures in the direction of a Z axis for generating an optical path which runs in the direction of a Y axis, the optical micrometer transmitting a linearly extending optical path of parallel light, within which the lens can be positioned, wherein the retaining device and the optical path can be rotated relative to each other around an axis of rotation R, the edge being adjustable in the circumferential direction to said axis of rotation R, wherein a pivotal axis S is provided by which the lens and the optical path can be pivoted relative to each other around an angle β, wherein the pivotal axis S comprises with the axis of rotation R an angle δ which is greater than 10° and less than 170°.

11. A measuring arrangement according to claim 10, wherein the angle β is less than 90°.

12. A measuring arrangement according to claim 10, wherein the axis of rotation R runs parallel to a Z-Y level of the optical path at a distance xR, or comprises with the Z-Y level an angle ε which is greater than 0° and less than 20°.

13. A measuring arrangement according to claim 10, wherein a further movement axis T is provided by means of which the lens and the optical path can be moved relative to each other in the direction of an X axis and at right-angles to the Y axis.

14. A measuring arrangement according to claim 10, wherein the retaining device can be affixed on one side on the lens.

15. A measuring arrangement according to claim 10, wherein the pivotal axis S comprises with the axis of rotation R the angle δ which is between 80° and 100°.

16. A measuring arrangement for measuring edges of an optical lens, and determining a first and a second Z coordinate Za, Zb for at least one point P1 of the edge, the edge extending in a circumferential direction to an axis of the optical lens, comprising: a retaining device for the lens and an optical micrometer which measures in the direction of a Z axis in order to generate an optical path which runs in the direction of a Y axis, the optical micrometer transmitting a linearly extending optical path of parallel light, within which the lens can be positioned, wherein the retaining device and the optical path can be rotated around an axis of rotation R relative to each other, the edge being adjustable in the circumferential direction to said axis of rotation R, wherein a second optical path which runs in the direction of an M axis is provided, within which the lens can be positioned, wherein between the M axis and the Y axis, an angle β is provided which is less than 90°, or the axis of rotation R runs parallel to a Z-Y level of the optical path at a distance xR, or the axis of rotation R comprises an angle ε with the Z-Y level which is greater than 0° and less than 20°.

17. A measuring arrangement according to claim to 16, wherein a further movement axis T is provided by means of which the lens and the optical path can be moved relative to each other in the direction of an X axis and at right-angles to the Y axis.

18. A measuring arrangement according to claim 16, wherein the retaining device can be affixed on one side on the lens.

* * * * *